United States Patent Office 3,078,284
Patented Feb. 19, 1963

3,078,284
2-HALO-5α-ANDROST-1-ENE-3,17-DIOLS AND DERIVATIVES THEREOF
Raymond E. Counsell and Paul D. Klimstra, Skokie, Ill., assignors to G. D. Searle & Co., Chicago, Ill., a corporation of Delaware
No Drawing. Filed Sept. 7, 1960, Ser. No. 54,376
14 Claims. (Cl. 260—397.5)

The present invention relates to compounds of the formula

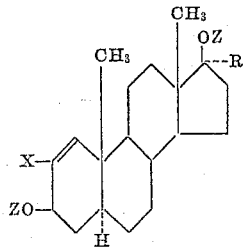

wherein X is halogen of atomic weight less than 80, R is hydrogen or alkyl, and Z is hydrogen or (alkyl)CO—. Among the alkyl radicals mentioned, especially lower alkyl radicals are preferred, for example, methyl, ethyl, propyl, isopropyl, butyl, isobutyl, sec-butyl, tert-butyl, pentyl, isopentyl, tert-pentyl, neopentyl, hexyl, isohexyl, heptyl and octyl.

The compounds of this invention possess valuable pharmacological properties. In particular they are anabolic, androgenic, and anti-estrogenic agents.

The compounds of the present invention are conveniently prepared by hydride reduction of the corresponding 3-ketones (which can be prepared by the procedure of Wiechert, Kaspar and Schenck, Union of South Africa Patent No. 59/3191), or, in the case of the species bearing a secondary hydroxyl at $C_{17}$, by reduction of the corresponding 3,17-diones. The resultant alcohols are readily acylated at the $C_3$ and/or $C_{17}$ hydroxyl groups to give the corresponding esters.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade, pressures in pounds per square inch, and relative amounts of materials in parts by weight, except as otherwise noted.

Example 1

2-bromo-3β,17β-dihydroxy-5α-androst-1-ene.—To a solution of 15 parts of 2-bromo-5α-androst-1-ene-3,17-dione in 100 parts of dry tetrahydrofuran surrounded by an ice bath is added with stirring a solution of 50 parts of lithium tri-t-butoxyalumino hydride in 400 parts of tetrahydrofuran, and the reaction mixture is stirred at bath temperature for 1¾ hours. At the end of this time 2500 parts of 5% aqueous acetic acid is added to destroy excess reducing agent, and the mixture thus obtained is extracted with ether. The extracts are washed with water, dried over anhydrous potassium carbonate, and evaporated to dryness. The residue is recrystallized from acetone-hexane to give 2-bromo-3β,17β-dihydroxy-5α-androst-1-ene, melting at 181–183°, $[\alpha]_D^{26}=+17°$ (chloroform). The structure may be expressed as

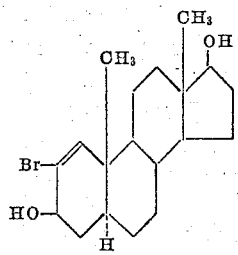

Example 2

2-bromo-3β,17β-diacetoxy-5α-androst-1-ene.—A mixture of 4 parts of 2-bromo-3β,17β-dihydroxy-5α-androst-1-ene, 10 parts of acetic anhydride and 100 parts of pyridine is allowed to stand at room temperature overnight. The resultant mixture is then poured into ice water, and the precipitate which forms is removed by filtration and recrystallized from aqueous ethanol to give 2-bromo-3β, 17β-diacetoxy-5α-androst-1-ene, melting at 179–182°, $[\alpha]_D^{25}=+12°$ (chloroform). The structure may be expressed as

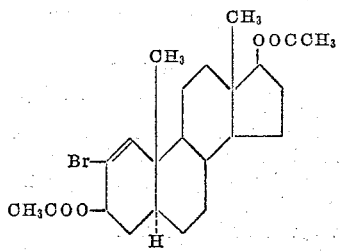

Example 3

2-bromo-3β,17β-dipropionoxy-5α-androst-1-ene.—Substitution of 10 parts of propionic anhydride for the acetic anhydride of Example 2 gives, by the procedure therein detailed, 2-bromo-3β,17β-dipropionoxy-5α-androst-1-ene.

Example 4

2-bromo-3β,17β-dihydroxy-17α-methyl-5α-androst-1-ene.—Substitution of 15 parts of 2-bromo-17β-hydroxy-17α-methyl-5β-androst-1-en-3-one for the 2-bromo-5α-androst-1-ene-3,17-dione of Example 1 gives, by the procedure therein detailed, 2-bromo-3β,17β-dihydroxy-17α-methyl-5α-androst-1-ene, melting at 186–188°, $[\alpha]_D^{25}=-3°$ (chloroform). The structure may be expressed as

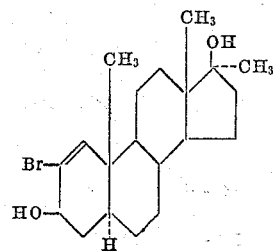

Example 5

*2-bromo-3β-acetoxy-17β-hydroxy - 17α - methyl-5α-androst-1-ene.*—Substitution of 4 parts of 2-bromo-3β,17β-dihydroxy-17α-methyl-5α-androst-1-ene for the 2-bromo-3β,17β-dihydroxy-5α-androst-1-ene of Example 2 gives, by the procedure therein detailed, 2-bromo-3β-acetoxy-17β-hydroxy-17α-methyl-5α-androst-1-ene.

Example 6

*2-bromo-3β-propionoxy - 17β - hydroxy-17α-methyl-5α-androst-1-ene.*—Substitution of 4 parts of 2-bromo-3β,17β-dihydroxy-17α-methyl - 5α - androst-1-ene for the 2-bromo-3β,17β-dihydroxy-5α-androst-1-ene and 10 parts of propionic anhydride for the acetic anhydride of Example 2 gives, by the procedure therein detailed, 2-bromo-3β-propionoxy-17β-hydroxy-17α-methyl-5α-androst-1-ene.

Example 7

*2-bromo-3β,17β-dihydroxy-17α-ethyl - 5α - androst - 1-ene.*—Substitution of 15 parts of 2-bromo-17β-hydroxy-17α-ethyl-5α-androst-1-en-3-one for the 2-bromo-5α-androst-1-ene-3,17-dione of Example 1 gives, by the procedure therein detailed, 2-bromo-3β,17β-dihydroxy-17α-ethyl-5α-androst-1-ene, melting at 155–157°, $[\alpha]_D^{25}$= —0.5° (chloroform). The structure may be expressed as

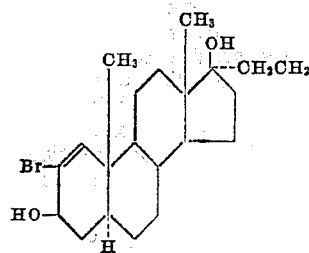

Example 8

*2-bromo-3β-acetoxy-17β-hydroxy-17α-ethyl-5α-androst-1-ene.*—Substitution of 4 parts of 2-bromo-3β,17β-dihydroxy-17α-ethyl-5α-androst-1-ene for the 2-bromo-3β,17β-dihydroxy-5α-androst-1-ene of Example 2 gives, by the procedure therein detailed, 2-bromo-3β-acetoxy-17β-hydroxy-17α-ethyl-5α-androst-1-ene.

Example 9

*2-bromo-3β-propionoxy-17β-hydroxy-17α-ethyl-5α - androst-1-ene.*—Substitution of 4 parts of 2-bromo-3β,17β-dihydroxy-17α-ethyl-5α-androst-1-ene for the 2-bromo-3β,17β-dihydroxy-5α-androst-1-ene and 10 parts of propionic anhydride for the acetic anhydride of Example 2 gives, by the procedure therein detailed, 2-bromo-3β-propionoxy-17β-hydroxy-17α-ethyl-5α-androst-1-ene.

Example 10

*2-chloro-3β,17β-dihydroxy-5α-androst-1 - ene.*—Substitution of 15 parts of 2-chloro-5α-androst-1-ene-3,17-dione for the 2-bromo-5α-androst-1-ene-3,17-dione of Example 1 gives, by the procedure therein detailed, 2-chloro-3β,17β-dihydroxy-5α-androst-1-ene, melting at 165–167°, $[\alpha]_D^{26}$=+23° (chloroform). The structure may be expressed as

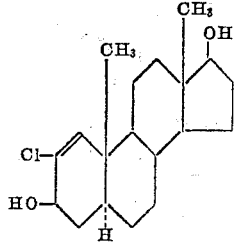

Example 11

*2-chloro-3β,17β-diacetoxy-5α-androst-1-ene.*—Substitution of 4 parts of 2-chloro-3β,17β-dihydroxy-5α-androst-1-ene for the 2-bromo-3β,17β-dihydroxy-5α-androst-1-ene of Example 2 gives, by the procedure therein detailed, 2-chloro-3β,17β-diacetoxy-5α-androst-1-ene.

Example 12

*2-chloro-3β,17β-dipropionoxy-5α-androst-1 - ene.*—Substitution of 4 parts of 2-chloro-3β,17β-dihydroxy-5α-androst-1-ene for the 2-bromo-3β,17β-dihydroxy-5α-androst-1-ene and 10 parts of propionic anhydride for the acetic anhydride of Example 2 gives, by the procedure therein detailed, 2-chloro-3β,17β-dipropionoxy-5α-androst-1-ene.

Example 13

*2-chloro-3β,17β-dihydroxy-17α-methyl - 5α - androst-1-ene.*—Substitution of 15 parts of 2-chloro-17β-hydroxy-17α-methyl-5α-androst-1-en-3-one for the 2-bromo-5α-androst-1-ene-3,17-dione of Example 1 gives, by the procedure therein detailed, 2-chloro-3β,17β-dihydroxy-17α-methyl-5α-androst-1-ene, melting at 162–165°, $[\alpha]_D^{26}$=0° (chloroform). The structure may be expressed as

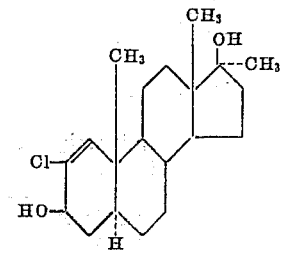

Example 14

*2-chloro-3β-acetoxy-17β-hydroxy-17α-methyl - 5α - androst-1-ene.*—Substitution of 4 parts of 2-chloro-3β,17β-dihydroxy-17α-methyl-5α-androst-1-ene for the 2-bromo-3β,17β-dihydroxy-5α-androst-1-ene of Example 2 gives, by the procedure therein detailed, 2-chloro-3β-acetoxy-17β-hydroxy-17α-methyl-5α-androst - 1 - ene, $[\alpha]_D^{26}$=—1° (chloroform). The structure may be expressed as

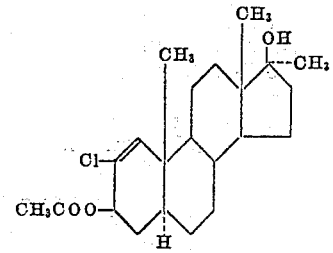

Example 15

*2-chloro-3β-propionoxy-17β-hydroxy-17α-methyl-5α-androst-1-ene.*—Substitution of 4 parts of 2-chloro-3β,17β-dihydroxy-17α-methyl-5α-androst-1-ene for the 2-bromo-3β,17β-dihydroxy-5α-androst-1-ene and 10 parts of propionic anhydride for the acetic anhydride of Example 2 gives, by the procedure therein detailed, 2-chloro-3β-propionoxy-17β-hydroxy-17α-methyl-5α-androst-1-ene.

Example 16

*2-chloro-3β,17β-dihydroxy-17α-ethyl - 5α - androst-1-ene.*—Substitution of 15 parts of 2-chloro-17β-hydroxy-17α-ethyl-5α-androst-1-en-3-one for the 2-bromo-5α-androst-1-ene-3,17-dione of Example 1 gives, by the procedure therein detailed, 2-chloro-3β,17β-dihydroxy-17α-ethyl-5α-androst-1-ene, melting at 184–186°, $[\alpha]_D^{26}$=+5°

(chloroform). The structure may be expressed as

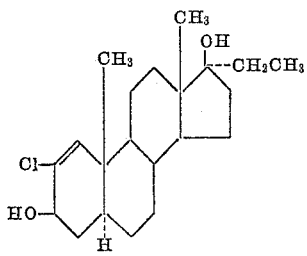

*Example 17*

2-chloro-3β-acetoxy-17β-hydroxy-17α-ethyl-5α-androst-1-ene.—Substitution of 4 parts of 2-chloro-3β,17β-dihydroxy-17α-ethyl-5α-androst-1-ene for the 2-bromo-3β,17β-dihydroxy-17α-ethyl-5α-androst-1-ene of Example 2 gives, by the procedure therein detailed, 2-chloro-3β-acetoxy-17β-hydroxy-17α-ethyl-5α-androst-1-ene, melting at 78–80°, $[\alpha]_D^{26} = +4°$ (chloroform). The structure may be expressed as

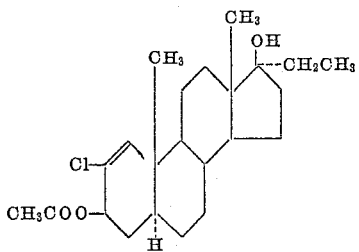

*Example 18*

2 - chloro - 3β - propionoxy-17β-hydroxy-17α-ethyl-5α-androst-1-ene.—Substitution of 4 parts of 2-chloro-3β,17β-dihydroxy-17α-ethyl-5α-androst-1-ene for the 2-bromo-3β,17β-dihydroxy-5α-androst-1-ene and 10 parts of propionic anhydride for the acetic anhydride of Example 2 gives, by the procedure therein detailed, 2-chloro-3β-propionoxy-17β-hydroxy-17α-ethyl-5α-androst-1-ene.

*Example 19*

2-fluoro-3β,17β-dihydroxy-5α-androst-1-ene.—Substitution of 15 parts of 2-fluoro-5α-androst-1-ene-3,17-dione for the 2-bromo-5α-androst-1-ene-3,17-dione of Example 1 gives, by the procedure therein detailed, 2-fluoro-3β-17β-dihydroxy-5α-androst-1-ene.

*Example 20*

2 - fluoro-3β,17β-diacetoxy-5α-androst-1-ene.—Substitution of 4 parts of 2-fluoro-3β,17β-dihydroxy-5α-androst-1-ene for the 2-bromo-3β,17β-dihydroxy-5α-androst-1-ene of Example 2 gives, by the procedure therein detailed, 2-fluoro-3β,17β-diacetoxy-5α-androst-1-ene.

*Example 21*

2 - fluoro-3β,17β-dipropionoxy-5α-androst-1-ene.—Substitution of 4 parts of 2-fluoro-3β,17β-dihydroxy-5α-androst-1-ene for the 2-bromo-3β,17β-dihydroxy-5α-androst-1-ene and 10 parts of propionic anhydride for the acetic anhydride of Example 2 gives, by the procedure therein detailed, 2-fluoro-3β,17β-dipropionoxy-5α-androst-1-ene.

*Example 22*

2 - fluoro - 3β,17β-dihydroxy-17α-methyl-5α-androst-1-ene.—Substitution of 15 parts of 2-fluoro-17β-hydroxy-17α-methyl-5α-androst-1-en-3-one for the 2-bromo-5α-androst-1-ene-3,17-dione of Example 1 gives, by the procedure therein detailed, 2-fluoro-3β,17β-dihydroxy-17α-methyl-5α-androst-1-ene.

*Example 23*

2 - fluoro - 3β-acetoxy-17β-hydroxy-17α-methyl-5α-androst-1-ene.—Substitution of 4 parts of 2-fluoro-3β,17β-dihydroxy-17α-methyl-5α-androst-1-ene for the 2-bromo-3β,17β-dihydroxy-5α-androst-1-ene of Example 2 gives, by the procedure therein detailed, 2-fluoro-3β-acetoxy-17β-hydroxy-17α-methyl-5α-androst-1-ene.

*Example 24*

2 - fluoro - 3β-propionoxy-17β-hydroxy-17α-methyl-5α-androst-1-ene.—Substitution of 4 parts of 2-fluoro-3β,17β-dihydroxy-17α-methyl-5α-androst-1-ene for the 2-bromo-3β,17β-dihydroxy-5α-androst-1-ene and 10 parts of propionic anhydride for the acetic anhydride of Example 2 gives, by the procedure therein detailed, 2-fluoro-3β-propionoxy-17β-hydroxy-17α-methyl-5α-androst-1-ene.

*Example 25*

2 - fluoro - 3β,17β - dihydroxy - 17α-ethyl-5α-androst-1-ene.—Substitution of 15 parts of 2-fluoro-17β-hydroxy-17α-ethyl-5α-androst-1-en-3-one for the 2-bromo-5α-androst-1-ene-3,17-dione of Example 1 gives, by the procedure therein detailed, 2-fluoro-3β,17β-dihydroxy-17α-ethyl-5α-androst-1-ene.

*Example 26*

2 - fluoro - 3β - acetoxy - 17β-hydroxy-17α-ethyl-5α-androst-1-ene.—Substitution of 4 parts of 2-fluoro-3β,17β-dihydroxy-17α-ethyl-5α-androst-1-ene for the 2-bromo-3β,17β-dihydroxy-5α-androst-1-ene of Example 2 gives, by the procedure therein detailed, 2-fluoro-3β-acetoxy-17β-hydroxy-17α-ethyl-5α-androst-1-ene.

*Example 27*

2 - fluoro - 3β - propionoxy-17β-hydroxy-17α-ethyl-5α-androst-1-ene.—Substitution of 4 parts of 2-fluoro-3β,17β-dihydroxy-17α-ethyl-5α-androst-1-ene for the 2-bromo-3β,17β-dihydroxy-5α-androst-1-ene and 10 parts of propionic anhydride for the acetic anhydride of Example 2 gives, by the procedure therein detailed, 2-fluoro-3β-propionoxy-17β-hydroxy-17α-ethyl-5α-androst-1-ene.

What is claimed is:
1. A compound of the formula

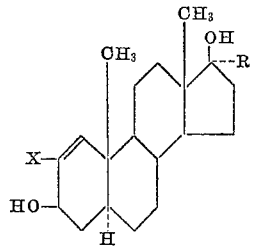

wherein X is halogen of atomic weight greater than 20 and less than 80, and R is a member of the class consisting of hydrogen and lower alkyl.
2. A compound of the formula

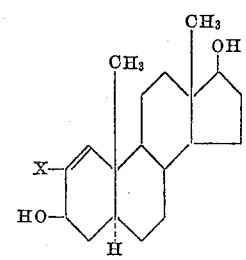

wherein X is halogen of atomic weight greater than 20 and less than 80.
3. 2-chloro-3β,17β-dihydroxy-5α-androst-1-ene.
4. 2-bromo-3β,17β-dihydroxy-5α-androst-1-ene.

5. A compound of the formula

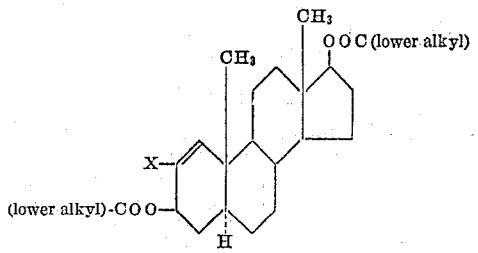

wherein X is halogen of atomic weight greater than 20 and less than 80.

6. 2-bromo-3β,17β-diacetoxy-5α-androst-1-ene.

7. A compound of the formula

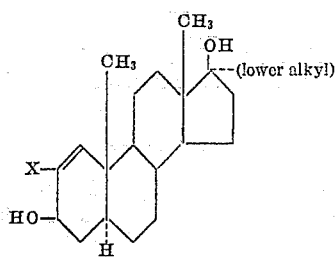

wherein X is halogen of atomic weight greater than 20 and less than 80.

8. 2 - chloro-3β,17β-dihydroxy-17α-methyl-5α-androst-1-ene.

9. 2 - chloro - 3β,17β-dihydroxy-17α-ethyl-5α-androst-1-ene.

10. 2 - bromo-3β,17β-dihydroxy-17α-methyl-5α-androst-1-ene.

11. 2 - bromo - 3β,17β-dihydroxy-17α-ethyl-5α-androst-1-ene.

12. A compound of the formula

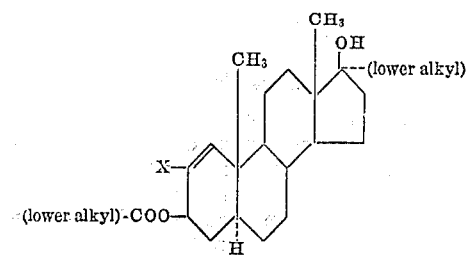

wherein X is halogen of atomic weight greater than 20 and less than 80.

13. 2 - chloro - 3β-acetoxy-17β-hydroxy-17α-methyl-5α-androst-1-ene.

14. 2 - chloro - 3β-acetoxy-17β-hydroxy-17α-ethyl-5α-androst-1-ene.

References Cited in the file of this patent
UNITED STATES PATENTS
2,971,963    Van der Burg _____ Feb. 14, 1961